United States Patent
DePietro et al.

[15] 3,653,490
[45] Apr. 4, 1972

[54] BOUSTROPHEDONIC TRANSPORT DEVICE

[72] Inventors: Alfonso DePietro, Valhalla; Guenther L. Kuehl, Peekskill, both of N.Y.

[73] Assignee: Guenther Systems, Inc., Buckanan, N.Y.

[22] Filed: Jan. 2, 1970

[21] Appl. No.: 112

[52] U.S. Cl. ............................................................198/153
[51] Int. Cl. ......................................................B65g 17/04
[58] Field of Search..................198/154, 137, 158, 138, 153

[56] References Cited

UNITED STATES PATENTS

| | | | |
|---|---|---|---|
| 2,329,178 | 9/1943 | Bausman.............................. | 198/138 X |
| 3,184,039 | 5/1965 | Czarnecki.............................. | 198/154 |

FOREIGN PATENTS OR APPLICATIONS

| | | | |
|---|---|---|---|
| 232,119 | 3/1969 | U.S.S.R. .................................. | 198/138 |

Primary Examiner—Edward A. Sroka
Assistant Examiner—Douglas D. Watts
Attorney—Brumbaugh, Graves, Donohue & Raymond

[57] ABSTRACT

A transport device in which a plurality of flexible support members of equal length form closed loops and are adapted to move about a plurality of guides in a circulatory manner. Corresponding flexible support members are arranged in pairs and are connected by a platform device on which a load can be carried. The guides are arranged so that the platform and the load move in a first horizontal direction, then in a vertical direction, and then in a second horizontal direction opposite to the first. A magazine through which the flexible support members pass reverses the order of the components of the platform device to compensate for the effect of the guides which control vertical motion.

6 Claims, 5 Drawing Figures

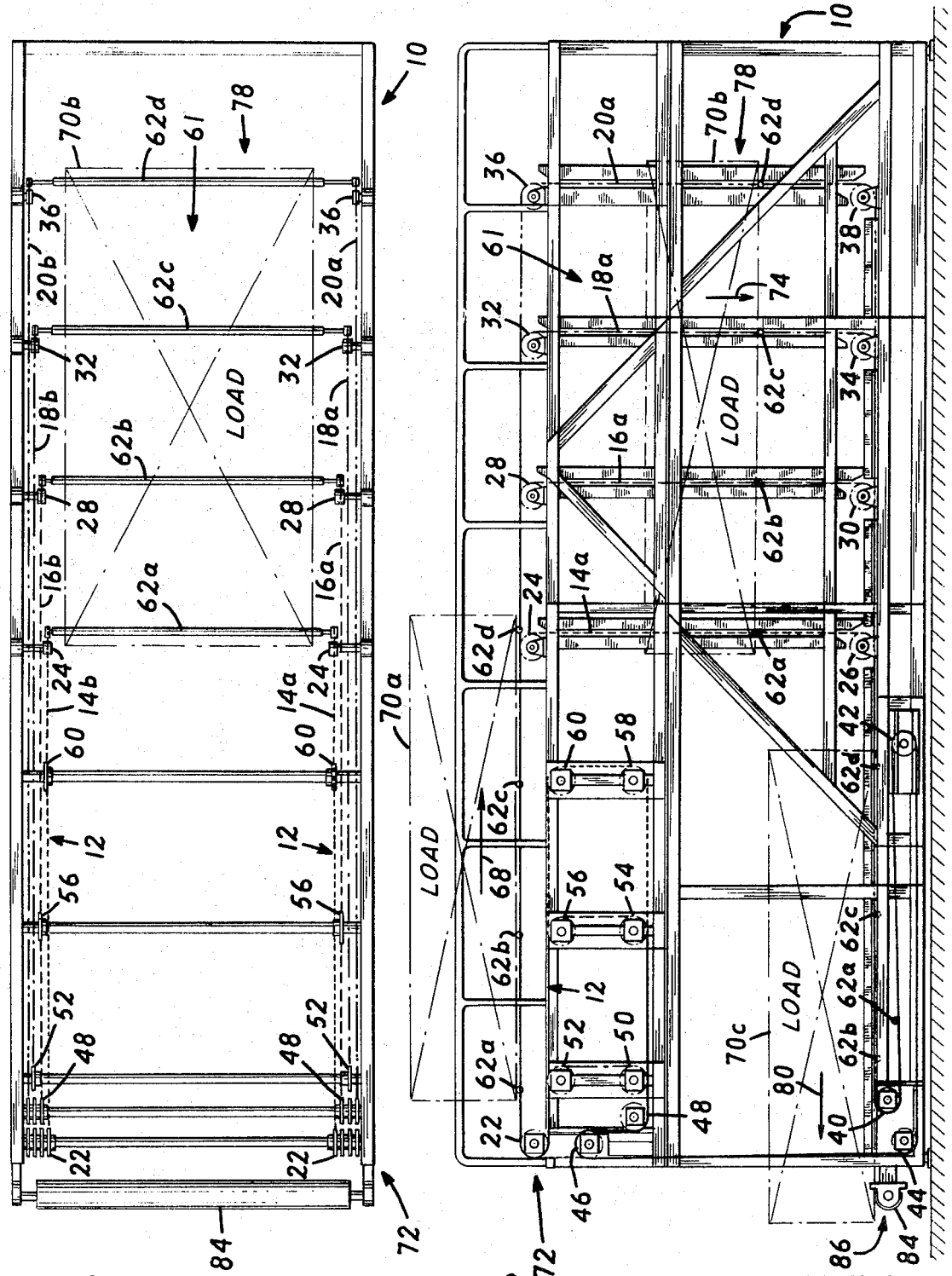

INVENTORS.
ALFONSO DePIETRO &
GUENTHER L. KUEHL

BY Brumbaugh, Graves,
Donohue + Raymond
their ATTORNEYS.

Patented April 4, 1972

INVENTORS.
ALFONSO DePIETRO &
GUENTHER L. KUEHL

BY Brumbaugh, Graves,
Donohue & Raymond
their ATTORNEYS.

BOUSTROPHEDONIC TRANSPORT DEVICE

BACKGROUND OF THE INVENTION

The application of Guenther L. Kuehl, Ser. No. 798,366, filed on Feb. 11, 1969, discloses and claims a "Transport Device" which is similar to the device disclosed and claimed herein except that in that device the second horizontal movement is in the same direction as the first.

The present invention relates to a conveyor apparatus and, more particularly, to conveyor apparatus for transporting a load in a first horizontal direction, then in a vertical direction, and then in a second horizontal direction opposite to the first. This type of motion is referred to herein as boustrophedonic.

There are many situations in which it is desired to move a load of material in a boustrophedonic path. This is often necessitated when loading and unloading cargo carriers and particularly aircraft. Problems of this type arise with great frequency in manufacturing and assembly plants wherein an efficient conveyor of this type would enable successive stages of an assembly line to be vertically displaced from each other on different floors of a building. This would allow industrial operations to expand upwardly in many instances in which other types of expansion are not possible. Moreover, it would make it possible to build assembly plants in crowded areas in which a work force is readily available but only limited land area can be provided.

In the past it has not been possible to build a conveyor which follows the desired boustrophedonic path without making the operation unduly complex and expensive. For example, it is a conventional practice to remove a load from a horizontal conveyor, either by hand or with a forklift truck, and to place it on an elevator which then takes it to a different vertical level. At the second vertical level the load must be handled again and placed on a second horizontal conveyor.

It should be noted that each of the three separate movements involved in a conventional operation of this type is essentially a reciprocatory movement. Reciprocatory movements, because of the constant stopping and starting of the device, tend to be inefficient and slow and are often not compatible with the other operations of a production line. It is also important that the vertical movement and each of the two horizontal movements are conventionally performed by separate apparatus. This requires two additional transfers of the load and presents the problem of synchronizing the three parts of the operation.

It is thus clear that it is highly desirable to have a single efficient conveyor of the general type which is conventionally used to move loads horizontally but which is capable of a combination of horizontal and vertical movements.

SUMMARY OF THE INVENTION

It is an object of the present invention to provide a transport device which fills the need described above and overcomes the disadvantages of previously known devices. It is a further object of the invention to provide a conveyor in which a plurality of flexible support members are adapted to move past a plurality of guide means in a circulatory manner so as to move a load in a first horizontal direction, then in a vertical direction, and then in a second horizontal direction which is opposite to the first horizontal direction.

The device of the invention comprises a plurality of flexible support members and a platform means for carrying a load to be transported comprising a plurality of spaced-apart connecting means supported by corresponding offset pairs of flexible support members. A first horizontal guide means is provided for guiding the flexible support members for movement along a first horizontal flow path. A vertical guide means is provided for guiding the flexible support members for movement along a flow path having a substantial vertical component while maintaining the platform means in a horizontal orientation. A second horizontal guide means is provided for guiding the flexible support members for movement along a second horizontal flow path which is opposite to the first. A magazine means is provided for reversing the order of the connecting members which form the platform means. In this way the platform means can move continuously in one direction.

The various guide means and the magazine means together comprise a plurality of sets of offset guides. Each set of guides is arranged to constrain a different pair of corresponding flexible support members. The paths followed by any two pairs of flexible support members through the vertical guide means are of different lengths. Each flexible support member, however, forms a closed loop of equal length. The connecting means leave the vertical guide means in the reverse of the order in which they enter it. This effect is compensated for by the magazine means.

BRIEF DESCRIPTION OF THE DRAWINGS

An understanding of additional aspects of the invention can be gained from a consideration of the following detailed description of a representative embodiment of the invention in conjunction with the appended drawings wherein:

FIGS. 1 and 2 are top and side orthogonal views respectively of a boustrophedonic transport device constructed in accordance with the invention;

DESCRIPTION OF THE PREFERRED EMBODIMENT

Figure 3:
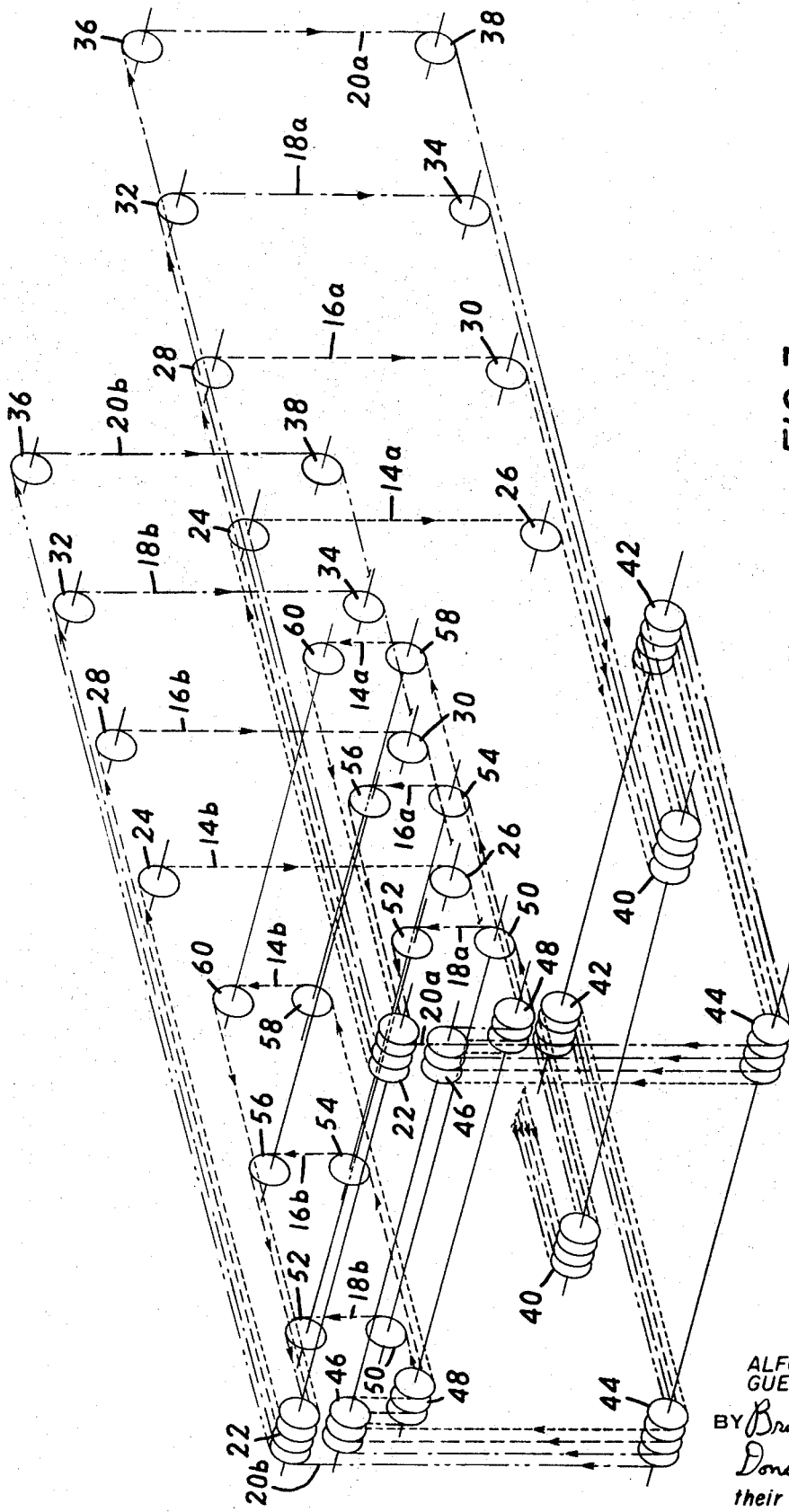
FIG. 3 is a three-dimensional schematic view of the paths followed by the flexible support members of the device of FIGS. 1 and 2.

A boustrophedonic transport device which is illustrative of the present invention, as shown in FIGS. 1 and 2, comprises a rigid frame 10 along each side of which is disposed a plurality of pairs of corresponding flexible support members 12 which may be chains of the type used in conventional conveyors. Thus, an innermost flexible support member 14a on one side of the frame 10 corresponds to an innermost flexible support member 14b on the opposite side of the frame 10. Two flexible support members 16a and 16b, which are adjacent to the members 14a and 14b respectively, also correspond to each other to form an offset pair, as do the next successive members 18a and 18b. The outermost pair of members 20a and 20b likewise correspond to each other.

At one end of the frame 10 the flexible members 12 are engaged by a plurality of guides 22 from which they extend along a first horizontal flow path at the top of the frame 10. The innermost flexible members 14a and 14b extend the shortest horizontal distance to a pair of upper guides 24 around which they make a 90° bend and then extend along a vertical flow path to a pair of lower guides 26 located near the bottom of the frame 10. The flexible members 16a and 16b, 18a and 18b and 20a and 20b extend over successively longer horizontal flow paths and are engaged by pairs of upper guides 24, 28, 32 and 36 respectively and pairs of lower guides 26, 28 and 30 respectively. The paths of the various flexible members 12 about their respective upper and lower guides can be seen most clearly in the three-dimensional view of FIG. 3.

The flexible members 12 extend along a second horizontal flow path from their respective lower guides 26, 30, 34 and 38 to a plurality of guides 40 about which they make a 180° bend and extend to another plurality of guides 42. The flexible members 12 then make a 180° bend about the guides 42 and extend horizontally to a plurality of guides 44 around which they make a 90° bend and extend upwardly.

The outermost pair of flexible members 20a and 20b which are constrained by the pairs of guides 36 and 38 (thus following the longest first and second horizontal flow paths) proceed directly from the guides 44 back to the guides 22. The pair of corresponding flexible members 18a and 18b, which follow the next to the longest horizontal flow path, is constrained by a plurality of pairs of guides 46, 48, 50 and 52 so as to be moved along a rectangular path through a magazine means before returning to the guides 22. The pair of flexible members 16a and 16b, which follow shorter horizontal flow paths than the members 18a and 18b, follows a longer rectangular path through the magazine means. Thus they are engaged by a plurality of pairs of guides 46, 48, 54 and 56 after leaving the guides 44 and before returning to the guides 22. The pair of flexible members 14a and 14b, which have followed the shortest horizontal flow paths, follow the longest rectangular path through the magazine means about a plurality of pairs of guides 46, 48, 58 and 60. The guides which cause the flexible members to follow their respective rectangular paths are arranged and positioned so that the path through the entire device followed by each of the flexible members 12 is of equal length.

The two corresponding flexible members 12 which form a pair are, in each case, joined to each other by a platform means 61. In FIG. 1 the platform means 61 is illustrated in only one position. In FIG. 2 the platform means 61 is illustrated in three successive positions designated 61a, 61b and 61c. The platform means 61 comprises a plurality of spaced-apart rigid connecting members 62a, 62b, 62c and 62d. The spacing between adjacent connecting members 62 is equal to the spacing between adjacent upper guides 24, 28, 32 and 36 and the spacing between adjacent lower guides 26, 30, 34 and 38.

Referring to FIG. 1, it can be seen that each pair of corresponding flexible members 12 is engaged by a separate set of offset guides. Each set of guides is arranged to guide a pair of flexible members 12. The guides that engage the flexible members 20a and 20b, which follow the longest horizontal flow path, are offset by the greatest distance. Thus each pair of flexible members 12 is offset by a greater distance than the pairs of flexible members 12 which follow shorter horizontal flow paths. This prevents the platform means 61 from becoming entangled in the support members 12 as its moves through the device.

The manner in which the invention can be operated to move a load in a boustrophedonic path will now be explained. Although it is possible to operate the device in two opposite directions it is assumed, for purposes of this explanation, that a load 70a is presented to the device adjacent to the plurality of guides 22 and moves first in the direction of an arrow 68 as successive connecting members 62 engage successive portions of the load 70a upon entering the first horizontal flow path. As the load moves between the guides 22 and the upper guides 24, 28, 32 and 36, it is supported at four points by the four connecting means 62 each of which may be a rigid tubular member. The flexible members 12 move in a circulatory manner and in a generally clockwise direction.

The apparatus may, in accordance with the explanation above, be said to include a first horizontal guide means for guiding the flexible support members 12 for movement along a first horizontal flow path the direction of which is indicated by the arrow 68. The first horizontal guide means comprises a section 72 of the frame 10 and may also be considered to comprise the upper guides 22, 24, 28, 32 and 36.

At the end of the first horizontal movement, the connecting members 62 will each simultaneously reach one of the guides 24, 28, 32 or 36. The connecting members 62 will then simultaneously move the load 70b in a vertical direction as indicated by an arrow 74. Thus the device includes a vertical guide means for guiding the flexible support members 12 for movement along a flow path having a substantial vertical component while maintaining the platform means 61 formed by the connecting members 62 in a substantially horizontal orientation. The vertical guide means comprises a section 78 of the frame 10 and may further be considered to comprise the guides 24, 26, 28, 30, 32, 34, 36 and 38.

Each of the connecting means 62 simultaneously reaches one of the lower guides 26, 30, 34 or 38 at the completion of its vertical movement. The connecting means 62 then move the load 70c along a second horizontal flow path opposite to the first and indicated in FIG. 2 by an arrow 80. It should be noted that in FIG. 2 the connecting means 62 which support the load 70c have reached the guides 40. The connecting means 62a has been separated from the load 70c and has begun to move toward the guides 42. The load 70c is about to be discharged from the device and is partially supported by an idler roller 84. At this point the load 70c is disengaged by each of the connecting members 62 successively.

Thus it can be understood that the device includes a second horizontal guide means for guiding the flexible support members 12 for movement along a second horizontal flow path which is opposite in direction to the first horizontal flow path. The second horizontal guide means comprises a portion 86 of the frame 10 and may be considered to further comprise the guides 40, 26, 30, 34 and 38.

It would, at first, appear that upon discharging the load 70c, it would be necessary to reverse the direction of the flexible members 12 and to move the platform means back through the vertical guide means to its starting position before a new operating cycle could begin because the various support members 12 have carried the connecting means 62 which form the platform means 61 through flow paths of unequal lengths and their order has been reversed. However, the device is provided with a unique magazine means which again reverses the order of the connecting means 62 and equalizes the paths followed by the support members 12. It thus compensates for the action of the vertical guide means. Because of the magazine means it is possible for the platform means 61 and the flexible support members 12 to move continuously in one direction and a reciprocatory motion need not be used. The magazine means comprises the guides 46, 48, 50, 52, 54, 56, 58 and 60 in addition to the portion of the frame 10 which supports them.

The magazine means and its operation can best be understood with reference to three-dimensional FIG. 3. The function of the magazine means is to equalize the lengths of the paths followed by each of the support members 12. Thus the paths of the members 14a and 14b, which follow the longest paths through the vertical guide means, must be directed through the greatest distance by the magazine means. This is necessary so that any given point along the flexible members 14a and 14b will be returned to its original position with respect to any given point on the other flexible members 12 at the completion of each operating cycle of the device. Just as the flexible members 14a and 14b are diverted by the magazine means, the flexible members 16a and 16b, as well as 18a and 18b, must be diverted by the magazine means, each through successively shorter distances. The flexible members 20a and 20b, which follow the longest path through the vertical guide means, are caused to move directly past the magazine means without being diverted by it. As well as equalizing the length of path followed by each of the support members 12, the magazine means reverses the order of the connecting means 62. The connecting means 62a which originally followed the members 62b, 62c and 62d is placed in the lead position as it passes through the vertical guide means. Because the magazine means diverts the path of the members 14a and 14b which carry the member 62a, it is returned to its trailing position before passing the guides 22. In this manner the magazine means reverses the orientation of the platform means 61.

Although the operation of the device has been described as it would be used to move the load in a first horizontal direction indicated by the arrow 68, then in a vertical direction indicated by the arrow 74 and then in a second horizontal direction indicated by the arrow 80, the direction of the operation of the device need not be inherent in its construction and it can easily be made reversible. Thus, referring to FIG. 2, it is immaterial whether the portion of the device there supporting the load 70a or the portion there supporting the load 70c is regarded as the first horizontal guide means.

The device has been described above with respect to an embodiment employing only one platform means 61. The device could employ a plurality of platform means, thereby enabling it to handle a number of loads simultaneously. By adjusting the distance between the guides 44 and the guides 42 it is possible to time the passage of the connecting means 62 past the guides 44 so that the movement of each platform means to the magazine means does not interfere with the movement of any load onto or off of the device at the idler roller 84.

Upon studying the path of the flexible members 12, it will be appreciated that the distance between adjacent connecting means 62 measured along the path of the flexible members 12 remains constant throughout an operating cycle of the device. However, the distance between adjacent connecting means 62 measured along a straight line does not remain constant as the connecting means 62 enter the magazine means and are constrained by the guides 46 and 48. This can be seen most clearly in FIG. 4 which represents a side view of the paths of the flexible members 12 illustrated three-dimensionally in FIG. 3.

The change which occurs in the straight-line distance between adjacent connecting means 62 does not present a problem if the platform means 61 comprises only the rigid tubular connecting means 62. However, depending upon the nature of the load to be transported, it may be desirable to utilize a contiguous web-like structure joining the connecting means 62. A platform means of this type must be flexible in one direction so that it can bend as it moves about the various guide means and should be rigid in a perpendicular direction to provide support for the load. The web may in fact be one integral piece, various portions of which form the connecting means which connect the corresponding flexible members 12. In the event that a web or other type of construction which provides a contiguous platform for the support of the load is utilized, it may be desirable to maintain a constant straight-line distance between adjacent connecting means 62. In this case it is desirable to modify the embodiment of the invention illustrated in FIGS. 1 through 4 and described above. FIG. 5 shows a side view of the paths followed by the flexible members 12 in such a modified embodiment of the invention. FIG. 5 is generally similar to FIG. 4 and the elements which are common to both embodiments are designated by the same numbers in both figures.

Figure 4:
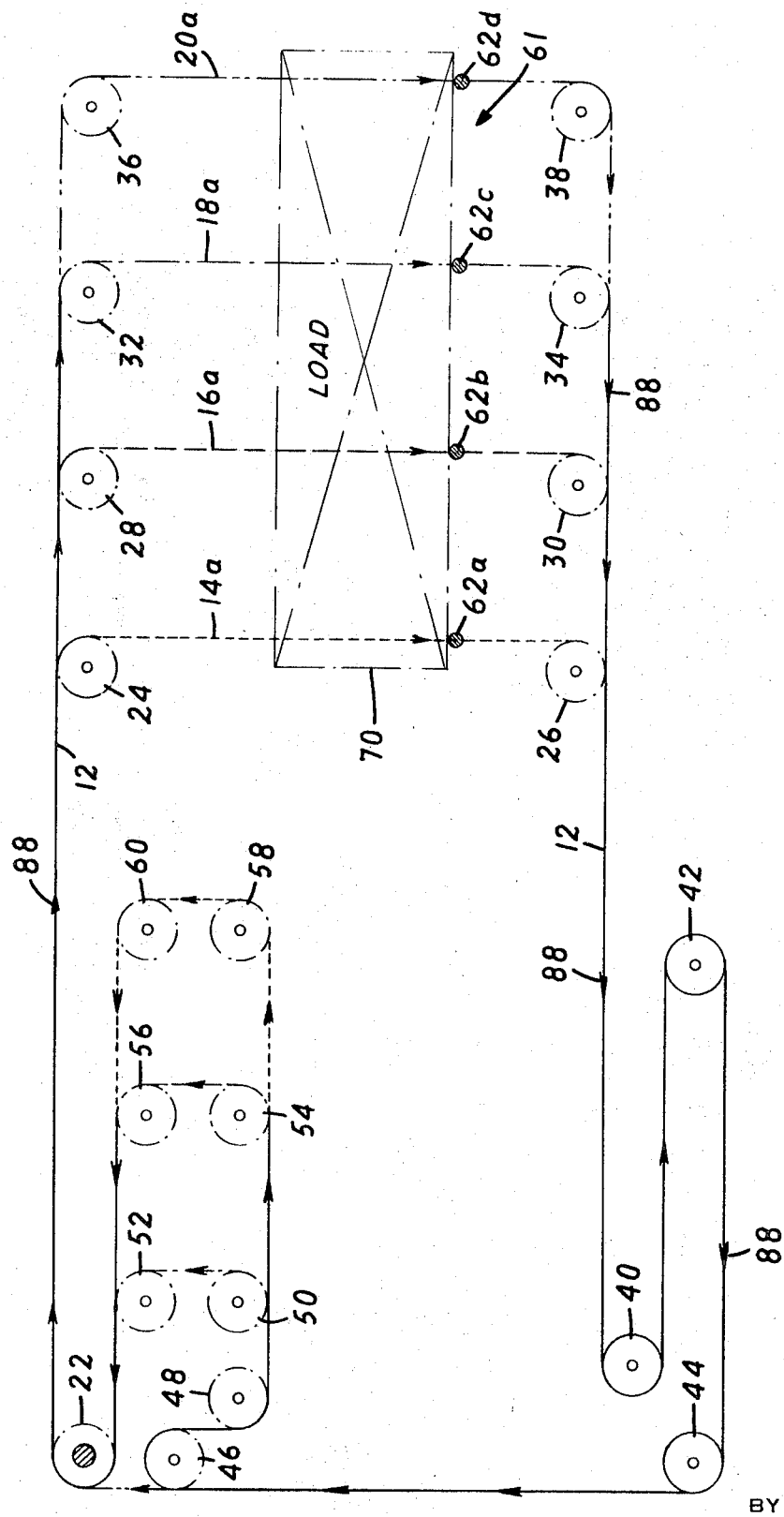
FIG. 4 is an orthogonal side view of the schematic shown in FIG. 3.
Figure 5:
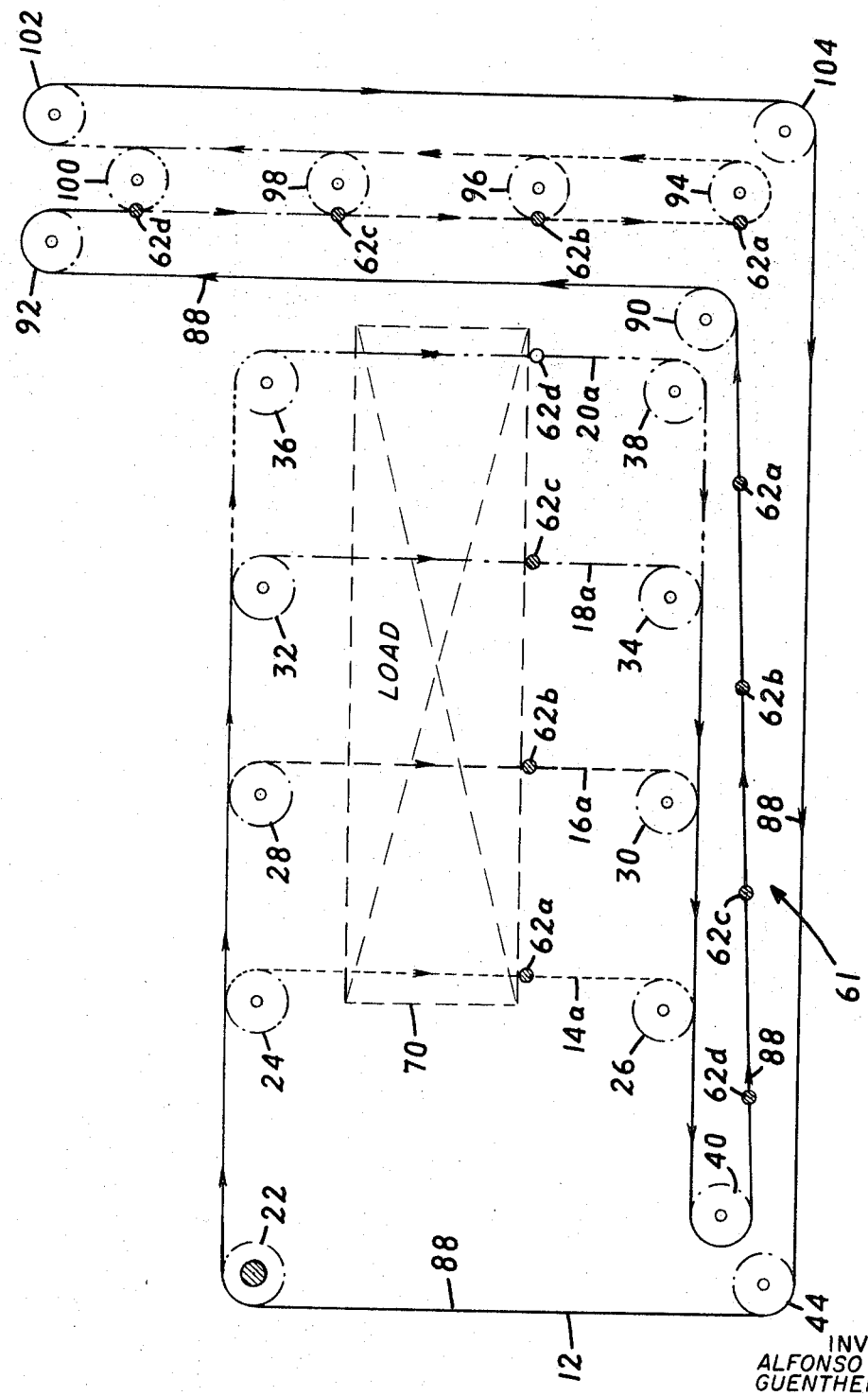
FIG. 5 is an orthogonal side view of a schematic of the paths followed by the flexible support members in another embodiment of the invention.

The operation and structure of the first and second horizontal guide means as well as the vertical guide means of the embodiment shown in FIG. 5 is similar generally to that of the embodiment shown in FIG. 4. Thus, reference may be made to previous discussion for an understanding of the similar portions of the two embodiments. The device will be described with respect to the flexible members 12 starting at the point at which they leave the guides 40 moving in the direction of a series of arrows 88 shown on the members 12.

The flexible members 12 move through the magazine means before they pass over the guides 44 and return to the guides 22. The vertical members 12 thus move past a plurality of guides 90 and then past another plurality of guides 92. The flexible members 14a and 14b, which follow the longest horizontal flow paths, extend the greatest distance from the guides 92 before being turned 180° about a pair of guides 94. Thus, the paths of flexible members 14a and 14b are extended the longest distance by the magazine means. Each of the pairs of offset flexible members 16a and 16b, 18a and 18b, and 20a and 20b follow successively shorter paths through the magazine means and are turned upon the pairs of guides 96, 98 and 100, respectively. The flexible members 12 then make a 180° turn about a plurality of guides 102 and a 90° turn about another plurality of guides 104 before they are engaged by the guides 44 from which they extend to the guides 22.

It should be noted that there are a number of essential differences between the embodiments of FIGS. 4 and 5. One such difference is that the magazine means are located in different places in these two embodiments. In FIG. 4 the magazine means is horizontally disposed adjacent to the first horizontal guide means. In FIG. 5 the magazine means is vertically disposed adjacent to the vertical guide means. In both embodiments, however, the flexible members 12 pass through the magazine means after they have passed through the second horizontal guide means and before they return to the first horizontal guide means.

Another difference between the embodiments of FIGS. 4 and 5 is that in the embodiment of FIG. 5 the direction of each pair of corresponding flexible members is changed in the magazine means by making a 180° turn about a single guide. For instance, in FIG. 5 the flexible member 14a passes around the guide 94 whereas in FIG. 4 an analogous function is performed with respect to flexible member 14a by the guides 58 and 60. Whether it is preferable to utilize one or two guides to accomplish this function is determined by the shape of the space available for the magazine means. It should also be noted that in the embodiment of FIG. 5 the horizontal paths are shorter. For this reason the magazine means is most conveniently disposed adjacent to the vertical guide means.

Another important difference between the embodiments of FIGS. 4 and 5, as indicated above, is that in the embodiment of FIG. 5 each of the flexible members 12 is diverted by the magazine means. In the arrangement of FIG. 4 the flexible members 20a and 20b move past the magazine means without being diverted by it. The arrangement of FIG. 5 thus maintains a constant straight-line distance between adjacent connecting means 62. This is desirable when the connecting means 62 are interconnected to provide a contiguous platform.

It will be apparent that various features of the embodiments shown in FIGS. 4 and 5 can be combined to form still other embodiments of the invention. For instance, each of the flexible members 12 could be turned 180° about a combination of two guides in the magazine as shown in FIG. 4, while in the same device all of the flexible members 12 could be diverted through the magazine to maintain a constant straightline distance between adjacent connecting means 62 as shown in FIG. 5.

Although the embodiment described above utilize four pairs of flexible members, it would be possible to transport a load using as few as two pairs of flexible members.

The use of chains for the flexible members 12 and sprockets for the various guides is preferred. This facilitates the use of guides, such as the plurality of guides 22, to provide a drive means for the device. In this manner it is possible to move the flexible members 12 in either of two opposite directions. The power supplied to the drive means may be derived from any conventional source such as an electric motor or a gasoline engine.

The height of the invention can be made adjustable by causing the vertical members of the frame 10 to pivot at the points at which they are connected to the horizontal members thus causing the overall path followed by the flexible members 12 to form a parallelogram rather than a rectangle.

It will be obvious to those skilled in the art that the embodiments described above are meant to be merely exemplary and that they are susceptible of modification and variation without departing from the scope and spirit of the invention. Therefore, the invention is not deemed to be limited except as defined by the appended claims.

I claim:

1. A transport device comprising a plurality of offset pairs of flexible support members, a corresponding plurality of connecting members selectively coupled to the offset pairs of flexible support members and forming a platform to support loads of material, means forming a first substantially horizontal flow path for the flexible support members wherein the connecting members are adapted to engage a load successively and are thereafter maintained in generally coextensive relation to support a load and are carried over unequal distances, means forming a substantially vertical flow path for the flexible support member wherein the connecting members are maintained in generally coextensive relation and are carried over equal distances, means forming a second substantially horizontal flow path for the flexible support members wherein the connecting members are maintained in generally coextensive relation and are carried over unequal distances in a direction which is substantially opposite to the first horizontal flow path and to a point wherein the connecting members disengage from the load to discharge the load, and magazine means for reversing the order of the connecting members between the first and second horizontal flow paths and equalizing the total lengths of the flow paths of each of the flexible support members whereby the support members ere caused to circulate continuously.

2. The device of claim 1 wherein the flow path forming means and the magazine means comprise a plurality of sets of guides, each of the sets being arranged to engage a different pair of flexible support members.

3. The device of claim 1 wherein the flexible support members are of equal length and are arranged in an endless loop.

4. The device of claim 1 wherein the platform means comprises a continuous structure that includes the connecting members.

5. The device of claim 1 wherein there are at least three pairs of support members.

6. The device of claim 1 wherein each pair of support members is offset by a greater distance than the pairs of support members which follow shorter horizontal flow paths.

* * * * *